US007865830B2

(12) United States Patent
Kim et al.

(10) Patent No.: US 7,865,830 B2
(45) Date of Patent: Jan. 4, 2011

(54) FEED AND EMAIL CONTENT

(75) Inventors: Jane T Kim, Seattle, WA (US); Amar S. Gandhi, Redmond, WA (US); Walter V. von Koch, Seattle, WA (US); Sean O. Lyndersay, Seattle, WA (US); Edward J. Praitis, Woodinville, WA (US); William Gould, Seattle, WA (US); David M. Ruzyski, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 366 days.

(21) Appl. No.: 11/179,149

(22) Filed: Jul. 12, 2005

(65) Prior Publication Data
US 2007/0016609 A1 Jan. 18, 2007

(51) Int. Cl.
G06F 17/30 (2006.01)
(52) U.S. Cl. .................................... 715/713; 715/760
(58) Field of Classification Search ................. 715/713, 715/760
See application file for complete search history.

(56) References Cited

U.S. PATENT DOCUMENTS

| 5,404,488 | A  | 4/1995  | Kerrigan et al. |
| 5,649,186 | A  | 7/1997  | Ferguson |
| 5,819,284 | A  | 10/1998 | Farber et al. |
| 5,880,767 | A  | 3/1999  | Liu |
| 5,926,796 | A  | 7/1999  | Walker et al. |
| 5,974,549 | A  | 10/1999 | Golan |
| 6,085,186 | A  | 7/2000  | Christianson et al. |
| 6,094,657 | A  | 7/2000  | Hailpern et al. |
| 6,282,546 | B1 | 8/2001  | Gleichauf et al. |
| 6,366,912 | B1 | 4/2002  | Wallent et al. |
| 6,411,331 | B1 | 6/2002  | Sansom-Wai et al. |
| 6,434,745 | B1 | 8/2002  | Conley, Jr. et al. |
| 6,489,968 | B1 * | 12/2002 | Ortega et al. ................. 715/713 |
| 6,507,349 | B1 * | 1/2003  | Balassanian ................. 345/676 |
| 6,515,681 | B1 * | 2/2003  | Knight ........................ 715/751 |
| 6,544,295 | B1 | 4/2003  | Bodnar |
| 6,594,692 | B1 | 7/2003  | Reisman |

(Continued)

FOREIGN PATENT DOCUMENTS

CA 2496672 2/2004

(Continued)

OTHER PUBLICATIONS

"Google Search Appliance Feeds Protocol Developer's Guide", Google Inc., Jun. 2, 2005, printed from website: http://code.google.com/gsa_apis/feedsguide.html, 11 pages.

(Continued)

Primary Examiner—don wong
Assistant Examiner—Kim T Nguyen

(57) ABSTRACT

System(s) and/or method(s) ("tools") are described that present content in a user interface tailored to trait(s) of the content. The tools can analyze content to determine its traits, classify the content based on its traits, and present the content in a user interface tailored to the classification. The tools can also organize content items into groups based on a common trait and enable a user to select content items through their group. Responsive to the user's selection of a group, the tools can present content, render enclosures, and alter traits of the content items in the group.

19 Claims, 13 Drawing Sheets

U.S. PATENT DOCUMENTS

| | | | |
|---|---|---|---|
| 6,597,377 B1* | 7/2003 | MacPhail | 715/738 |
| 6,694,431 B1 | 2/2004 | Binding et al. | |
| 6,708,172 B1 | 3/2004 | Wong et al. | |
| 6,732,102 B1* | 5/2004 | Khandekar | 1/1 |
| 6,766,458 B1 | 7/2004 | Harris et al. | |
| 6,775,772 B1 | 8/2004 | Binding et al. | |
| 6,829,619 B1* | 12/2004 | Wakamatsu et al. | 1/1 |
| 6,874,084 B1 | 3/2005 | Dobner et al. | |
| 7,137,009 B1 | 11/2006 | Gordon et al. | |
| 7,143,084 B1* | 11/2006 | Rinearson et al. | 707/3 |
| 7,257,564 B2* | 8/2007 | Loughmiller et al. | 706/16 |
| 7,676,575 B2 | 3/2010 | Yamada et al. | |
| 2002/0108115 A1 | 8/2002 | Palmer | |
| 2002/0116630 A1 | 8/2002 | Stehlin | |
| 2002/0124172 A1 | 9/2002 | Manahan | |
| 2002/0133720 A1 | 9/2002 | Sherman | |
| 2002/0156905 A1 | 10/2002 | Weissman | |
| 2002/0174201 A1 | 11/2002 | Ramer et al. | |
| 2002/0184491 A1 | 12/2002 | Morgan et al. | |
| 2002/0194151 A1 | 12/2002 | Fenton et al. | |
| 2003/0014406 A1 | 1/2003 | Faieta et al. | |
| 2003/0028762 A1 | 2/2003 | Trilli et al. | |
| 2003/0050995 A1* | 3/2003 | Mateos | 709/217 |
| 2003/0101412 A1* | 5/2003 | Eid | 715/513 |
| 2003/0117511 A1 | 6/2003 | Belz et al. | |
| 2003/0135504 A1 | 7/2003 | Elvanoglu et al. | |
| 2003/0137538 A1* | 7/2003 | Hesmer et al. | 345/760 |
| 2003/0167402 A1* | 9/2003 | Stolfo et al. | 713/200 |
| 2003/0177501 A1* | 9/2003 | Takahashi et al. | 725/110 |
| 2004/0003097 A1* | 1/2004 | Willis et al. | 709/228 |
| 2004/0046885 A1 | 3/2004 | Regan et al. | |
| 2004/0093563 A1 | 5/2004 | Pasquali | |
| 2004/0143683 A1 | 7/2004 | Greenwood | |
| 2004/0167964 A1 | 8/2004 | Rounthwaite et al. | |
| 2004/0177383 A1* | 9/2004 | Martinolich et al. | 725/138 |
| 2004/0181753 A1 | 9/2004 | Michaelides | |
| 2004/0210824 A1* | 10/2004 | Shoff et al. | 715/500.1 |
| 2004/0225749 A1 | 11/2004 | Pavlik et al. | |
| 2004/0230676 A1 | 11/2004 | Spivack et al. | |
| 2004/0250115 A1 | 12/2004 | Gemmel et al. | |
| 2004/0268258 A1 | 12/2004 | Lee et al. | |
| 2005/0010595 A1 | 1/2005 | Brown et al. | |
| 2005/0015452 A1* | 1/2005 | Corson | 709/206 |
| 2005/0033657 A1 | 2/2005 | Herrington et al. | |
| 2005/0038717 A1 | 2/2005 | McQueen, II et al. | |
| 2005/0050460 A1 | 3/2005 | Bedingfield | |
| 2005/0065906 A1* | 3/2005 | Romero | 707/1 |
| 2005/0088452 A1 | 4/2005 | Hanggie et al. | |
| 2005/0097180 A1 | 5/2005 | Abdelhak | |
| 2005/0108227 A1 | 5/2005 | Russell-Falla et al. | |
| 2005/0119910 A1 | 6/2005 | Schneider | |
| 2005/0119913 A1 | 6/2005 | Hornreich et al. | |
| 2005/0165615 A1 | 7/2005 | Minar | |
| 2005/0171836 A1* | 8/2005 | Leacy | 705/14 |
| 2005/0216439 A1 | 9/2005 | Kawakita | |
| 2005/0256768 A1 | 11/2005 | Robinson | |
| 2005/0268100 A1 | 12/2005 | Gasparini et al. | |
| 2006/0053293 A1 | 3/2006 | Zager et al. | |
| 2006/0218403 A1 | 9/2006 | Sauve et al. | |
| 2006/0230021 A1* | 10/2006 | Diab et al. | 707/3 |
| 2007/0061711 A1 | 3/2007 | Bodin et al. | |
| 2007/0094389 A1 | 4/2007 | Nussey et al. | |
| 2007/0100836 A1 | 5/2007 | Eichstaedt et al. | |
| 2007/0100959 A1 | 5/2007 | Eichstaedt et al. | |
| 2007/0130518 A1 | 6/2007 | Shavit et al. | |
| 2007/0282973 A1 | 12/2007 | Chapman et al. | |

FOREIGN PATENT DOCUMENTS

| | | |
|---|---|---|
| EP | 1128288 | 8/2001 |
| GB | 2364408 | 1/2002 |
| JP | 2009506401 | 2/2009 |
| RU | 20050015452 | 1/2005 |
| RU | 20050088452 | 4/2005 |
| WO | WO0126018 | 4/2001 |
| WO | WO 02/07013 | 1/2002 |
| WO | WO 2004/107216 | 12/2004 |
| WO | WO2005027402 | 3/2005 |
| WO | WO2005089336 | 9/2005 |
| WO | WO2005098675 | 10/2005 |

OTHER PUBLICATIONS

"iSpeak It: Web Feeds and Podcasts", ZappTek, 2002, printed from website: http://www.zapptek.com/ispeak-it/webpage.html, 3 pages.

"Mac OS X Server", Apple Computer Inc., 2005, printed from website: http://www.apple.com/server/macosx/features/collaborationservices.html., 3 pages.

"MX RSS Reader-Writer: Use RSS feeds in your sites", InterAKT, printed Jun. 21, 2005 from website: http://www.interaktonline.com/Products/Dreamweaver-Extensions/MXRSSReader-Writer/Overview/?from=gg_rss, 2 pages.

"Safari RSS: Your Desktop is the new doorstep", Apple Computer Inc., 2005, printed from website: http://www.apple.com/macosx/features/safari/, 3 pages.

Microsoft, Andersen et al. "Changes to Functionality in Microsoft Windows XP Service Pack 2", website at http://www.microsoft.com/technet/prodtechnol/ winxppro/maintain /sp2brows.mspx, Aug. 9, 2004, 58 pages, printed Jul. 7, 2005.

Microsoft. "Increase Your Browsing and E-Mail Safety" website at http://www.microsoft.com/security/incident/settings.mspx, Oct. 3, 2003, 4 pages, pritned Jul. 7, 2005.

Mozilla, "Why Use Firefox", website at http://www.mozilla.org/products/firefox, Jun. 17, 2005, 3 pages, printed Jul. 7, 2005.

ATPM, Tetrault, Gregory, "Review: Anonymizer Ultimate Security Suite", website at http://www.atpm.com/8/.09/anonymizer.shtml, Sep. 2002, 12 pages, printed Jul. 7, 2005.

"About Syndication, RSS, and Other Web-Altering Chemicals", FeedBurner, printed on Jun. 21, 2005 from website: http://www.feedburner.com/fb/a/aboutrss;jsessionid=96C24011924801F8B3CAF4F12B66B75D.app2, 2 pages.

"Dreams of a Rarebit Fiend", printed on Jun. 21, 2005 from website: http://www.johnmunsch.com/projects/HotSheet/, 6 pages.

"Latest Headline Viewer news and information", Version: 0.9.9, Mar. 2, 2005, printed from website: http://www.headlineviewer.com/news/index.shtml, 3 pages.

"Project: RSS Viewer: Summary", SourceForge, 2005, printed from website: http://sourceforge.net/projects/rssview/, 3 pages.

"Welcome to Feed on Feeds, your server side personal RSS(and Atom!) aggregator", printed on Jun. 21, 2005 from website: http://feedonfeeds.com/, 4 pages.

"What is Reptile?", printed on Jun. 21, 2005 from website: http://reptile.openprivacy.org/overview.html, 2001, 4 pages.

Six Apart: Developer Documentation : Trackback Technical Specification, Printed on Feb. 15, 2008, website: http://www.sixapart.com/pronet/docs/trackback_spec, 5 pages.

Wikipedia, "RSS", Printed on Feb. 16, 2008, website: http://en.wikipedia.org/w/index.php?title=RSS&direction=next&oldid=18620370, 4 pages.

Wikipedia, "Trackback", Printed on Feb. 15, 2008, website: http://en.wikipedia.org/w/index.php?title=Trackback&oldid=16308389.

Acrobat Tracker 7.0.5 Available at http://partners.adobe.com/public/developer/en/acrobat/sdk/pdf/javascript/Tracker.pdf, Jul. 27, 2005, pp. 1-48.

Galbraith et al., "RssPing," available on the Internet at http://rssping.com.

I/ON User Guide Availabel at http://openvision.tv/home/viewer/tutorial, pp. 1-7.

"Ranchero Software: What's New in NetNewsWire 2.0", Web article, retrieved from <http://web.archive.org/web/20050618014501/http://ranchero.com/netnewswire/whatsnew/netnewswire20.php> on Nov. 13, 2008,pp. 1-3.

"syncing.png", *Print Screen from article*, retrieved from <http://web.archive.org/web/20050623095327/http://ranchero.com/images/nnw2/syncing.png> on Nov. 13, 2008, 1 page.

"Ranchero Software Search Engine Subscriptions", *On-line Article*, Retrieved from <http://web.archive.org/web/20050714082710/http://ranchero.com/netnewswire/features/searchEngineSubscriptions.php> on Nov. 13, 2008,pp. 1-2.

"SearchFeed.png", *Print Screen in article*, Retrieved from <http://web.archive.org/web/20050623095831/http://ranchero.com/images/nnw2/searchFeed.png> on Nov. 13, 2008,1 page.

"Searching.png", *Print Screen from article*, Retrieved from <http://web.archive.org/web/20050623095422/http://ranchero.com/images/nnw2/searching.png> on Nov. 13, 2008,1 page.

"Ranchero Software_Smart Lists", *Internet Article*, Retrieved from <http://web.archive.org/web/20050602084724/http://ranchero.com/netnewswire/features/smartLists.php> on Nov. 13, 2008,pp. 1-2.

"smartList.png", *Print Screen from Internet Article*, Retrieved from <http://web.archive.org/web/20050623095628/http://ranchero.com/images/nnw2/smartList.png> on Nov. 13, 2008, 1 page.

"Ranchero Software_Flagged Items", *Internet Article*, Retrieved from <http://web.archive.org/web/20050612083011/http://ranchero.com/netnewswire/features/flaggedItems.php> on Nov. 13, 2008,1 page.

"Rancho Software_Features Chart", *Internet Article*, Retrieved from <http://web.archive.org/web/20050609010027/http://ranchero.com/netnewswire/featureschart20.php> on Nov. 13, 2008,pp. 1-3.

"Persistence.png", *Print Screen from Internet Article*, Retrieved from <http://web.archive.org/web/20050623095937/http://ranchero.com/images/nnw2/persistence.png> on Nov. 13, 2008,1 page.

"Ranchero Software_Subscription Sharing", *Internet Article*, Retrieved from <http://web.archive.org/web/20050811083741/http://ranchero.com/netnewswire/features/sharing.php> on Nov. 13, 2008,pp. 1-3.

"mainWindow2.png", *Print Screen from Internet Article*, Retrieved from <http://web.archive.org/web/20050623095300/http://ranchero.com/images/nnw2/mainWindow2.png> on Nov. 13, 2008,1 page.

"Ranchero Software_NetNewsWire", *Internet Article*, Retrieved from <http://web.archive.org/web/20051003204517/ranchero.com/netnewswire/> on Nov. 13, 2008,pp. 1-5.

"Search Engine Subscriptions", *Internet Article*, Retrieved from <http://web.archive.org/web/20051217013212/http://ranchero.com/netnewswire/helpBook/searchEngineSubs.html> on Nov. 13, 2008,1 page.

"Subscribing and Unsubscribing", *Internet Article*, Retrieved from <http://web.archive.org/web/20060915152527/http://ranchero.com/netnewswire/helpBook/subUnsub.html> on Nov. 13, 2008,pp. 1-2.

"Ranchero Software_NetNewsWire 2.0 Change Notes", *Internet Article*, Retrieved from <http://web.archive.org/web/20051024203943/http://ranchero.com/netnewswire/changenotes/netnewswire20.php> on Nov. 13, 2008,pp. 1-3.

"Yahoo! Search Services and Tools", *Internet Search Screen*, Retrieved from <http://web.archive.org/web/20051001065344/http://search.yahoo.com/mrss/submit> on Nov. 13, 2008,1 page.

"Yahoo! Publisher's Guide to RSS : Submit your RSS Feed", *Internet Article*, Retrieved from <http://web.archive.org/web/20051216153612/http://uk.promotions.yahoo.com/publisher/submit.html> on Nov. 13, 2008,pp. 1-3.

"Blogdigger—Add Feed Form", *Internet Resource*, Retrieved from <http://web.archive.org/web/20050618015745/http://www.blogdigger.com/add.jsp> on Nov. 13, 2008 1 of> on Nov. 13, 2008,1 page.

"RSS Submissions", *Internet Article*, Retrieved from <http://web.archive.org/web/20050619014308/http://www.rss-specifications.com/rss-submission.htm> on Nov. 13, 2008,pp. 1-3.

"Ranchero Software_Editing LiveJournal Logs", *Internet Article*, Retrieved from <http://web.archive.org/web/20051217022724/http://ranchero.com/netnewswire/tips/livejournalconfig.php> on Nov. 13, 2008,pp. 1-3.

"Ranchero Software_NetNewsWfaq", *Internet Search Engine FAQ sheet*, Retrieved from <http://web.archive.org/web/20030201120948/http://ranchero.com/netnewswire/faq.php> on Nov. 13, 2008,pp. 1-4.

"NetNewsWire_helpbook_faq", *Internet Search FAQ sheet*, Retrieved from <http://web.archive.org/web/20050623234918/http://ranchero.com/netnewswire/helpBook/faq.html> on Nov. 13, 2008,pp. 1-3.

"Syndic8.com—Documents1", *Internet Article*, Retrieved from <http://web.archive.org/web/20050513214756/http://www.syndic8.com/documents/howto/> on Nov. 13, 2008,pp. 1-3.

"Syndic8.com—Documents2", *Internet Article*, Retrieved from <http://web.archive.org/web/20050622035505/http://www.syndic8.com/documents/howto/> on Nov. 13, 2008,pp. 1-3.

"Syndic8.com—HowToUse", *Internet Article*, Retrieved from <http://web.archive.org/web/20050619233841/http://www.syndic8.com/howto.php> on Nov. 13, 2008,pp. 1-4.

"Kalsey_Blogfeed", *Internet Article*, Retrieved from <http://web.archive.org/web/20050515005125/http://vvww.kalsey.com/tools/blogfeed/> on Nov. 13, 2008,pp. 1-3.

"Feed Splicing, Part 1", Retrieved from: "http://blogs.feedburnercom/feedburner/archives/2004/07/feed_splicing_part_i.p.hp", (Jul. 14, 2004),5 Pages.

"Feed Burner", Retrieved from: "http://www.feedburner.com.", 1 Page.

"Introduction to RSS", Retrievedfrom: "http://www.webreference.com/authoring/languages/xml/rss/intro.", 3 Pages.

"Feed Splicing, Part 2", Retrieved from: "http://blogs.feedburner.com/feedburner/archives/2004/08feed_splicing_part_ii.php", The Feed Thickens. http://blog.flicker.net/en/2007/14/the-feed-thickens. ,5 Pages.

Verisign Inc., "Licensing verisign certificates: securing multiple web server and domain configurations", www.msctrustgate.com/pdf/licensing.pdf, white paper,(2001).

Herzberg, Amir et al., "Protecting valve web users, or preventing spoofing and establishing credential sites", www.cs.bu.ac.il/~herzea/papers/ecommerce/trusted credentials area.pdf, Bar Ilan University,(Jul. 2004).

Ncipher Inc., "Protecting commercial secure web servers from key-finding treats", www.ncipher.com/uploads/resources/pcws.pdf, white paper,(1999).

"flaggeditems.png", *Print screen from Internet Search*, Retreived from <http://web.archive.org/web/20050623095655/http://ranchero.com/images/nnw2/flaggeditems.png> on Nov. 13, 2008,1 page.

"Attensa Outlook Getting Started", Attensa, Inc., Portland, OR., 2005, pp. 1-33.

Ayers, et al., "Beginning RSS and Atom Programming", Wiley, Inc., Indianapolis, IN., 2005, pp. 14-16, 38-42, 69, 156-171, 185-194, 247-249, 333-340, 363-364.

Blair, "Review: Netnewswire 2.0", retrieved on Nov. 11, 2008 at http://www.atpm.com/11.06/netnewswire.shtml, ATPM 11.06, Jun. 2005, pp. 1-12.

CN1536483 (Chinese Version).

CN1536483 English Abstract (SIPO).

Hammersley, "Content Syndication with RSS", O'Reilly & Associates, Sebastopol, CA, Mar. 2003, pp. 132-148.

Hammersley, "Developing Feeds with RSS and Atom", O'Reilly Media, Inc., Sebastopol, CA., Apr. 2005, pp. 19,20,22,23,155,160,162.

Huier, et al., "Design and Implementation of RSS-based Science and Technology Information Syndication System", Library of Chinese Academy of Science, Bejing 100080, China, pp. 1-15.

RSS 2.0 Specification, Jul. 15, 2003, 8 pgs.

"Final Office Action", U.S. Appl. No. 10/187,389, filed Jun. 15, 2009,25 pages.

"Version 4 Update", Retrieved from <http://web.archive.org/web/2000110909500/ww.cookiecentral.com/version4.htm, (Nov. 9, 2000),3 pages.

"Persistent Client State HTP Cookies", Retrieved from <http://web.archive.org/web/20001109063700/www.netscape.com/newsref/std/cookie_spec.html, (Nov. 9, 2000),2 pages.

Koch, Katherine "Platform for Privacy Preferences Project: Present and Future", *6.805 Ethics and Law on the Electronic Frontier*, (May 17, 2001),pp. 1-71.

Perenson, Melissa J., "Crush Those Cookies, or Just Manage Them", Retrieved from: <http://www.pcworld.com/resource/printable/article/0,aid,15771.00.asp> on Oct. 3, 2005, PC World,(Mar. 17, 2000),3 pages.

"Cookie Crusher Tour—The Limit Software", Retrieved from: <http://www.thelimitsoft.com/cookie/tour//tour3.html> on Oct. 3, 2005, (Nov. 9, 2000),3 pages.

"PCT Search Report and Written Opinion", Application No. PCT/US06/26855, (Aug. 5, 2008),10 pages.

Hetherington, et al., "Web Marketing Personas", U.S. Appl. No. 09/461,507, filed Dec. 14, 1999,37 pages.

"Extended EP Search Report", European Patent Application No. 06786267.2, (May 21, 2010),5 pages.

"Foreign Office Action", Russian Application No. 2008101465, (Aug. 9, 2010),7 pages.

"Foreign Office Action", Chinese Application No. 200680024442.3, (Oct. 20, 2010),9 pages.

* cited by examiner

FEED AND EMAIL CONTENT

BACKGROUND

Many computer users subscribe to feeds from network sources. These feeds provide news, blog entries, lists, media, and the like. A user's local computer presents these feeds so that the user can consume the feeds' contents, such as read the news or see a blog entry. But applications that present feeds often provide users with a consuming experience having significant drawbacks.

SUMMARY

System(s) and/or method(s) ("tools") are described that present content in a user interface tailored to trait(s) of the content. The tools can analyze content to determine its traits, classify the content based on its traits, and present the content in a user interface tailored to the classification. The tools can also organize content items into groups based on a common trait and enable a user to select content items through their group. Responsive to the user's selection of a group, the tools can present content, render enclosures, and alter traits of the content items in the group.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The same numbers are used throughout the disclosure and figures to reference like components and features.

DETAILED DESCRIPTION

Overview

The following document describes tools that present content in a user interface tailored to traits of the content. In one embodiment, the tools organize content items into groups based on the content items having a common trait and enable a user to select content items by their group. Responsive to the user's selection of a group, the tools can present content, render enclosures, and alter traits of content items in the selected group.

Exemplary Operating Environment

Before describing the tools in detail, the following discussion of an exemplary operating environment is provided to assist the reader in understanding where and how the tools may be employed. The description provided below constitutes but one example and is not intended to limit application of the tools to any one particular operating environment.

Figure 1:
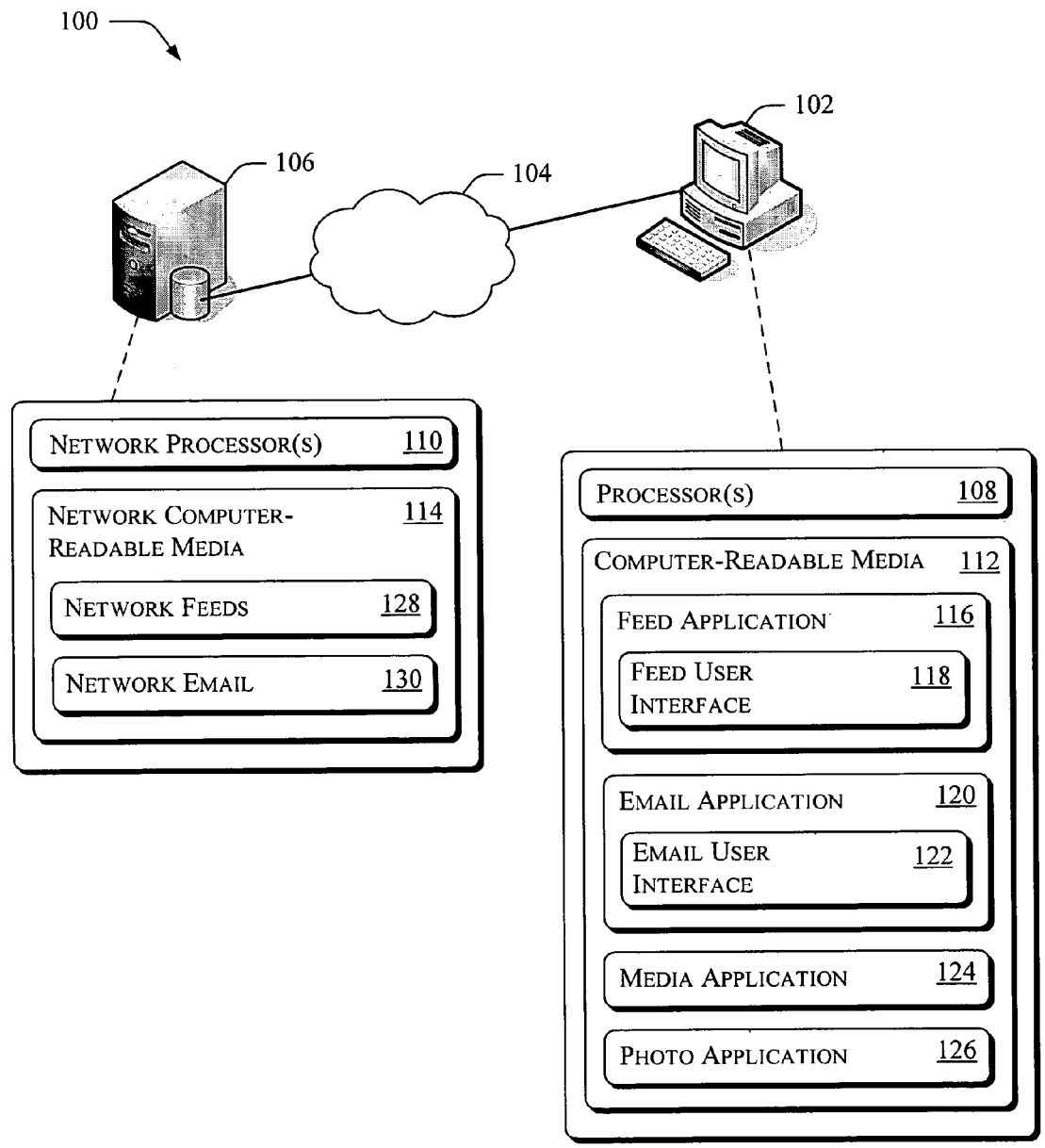
FIG. 1 illustrates an exemplary operating environment in which various embodiments can operate.

FIG. 1 illustrates one such operating environment generally at 100 comprising a computer 102, a communication network 104, and a network computer 106. The computer and network computer are shown comprising one or more processor(s) 108 and 110 and computer-readable media 112 and 114, respectively. Processors 108 and 110 are capable of executing instructions on computer-readable media 112 and 114, respectively. The communication network enables communication between the computer and the network computer and may comprise one or more of an intranet, such as a company's internal network, the Internet, and the like.

Computer-readable media 112 comprises instructions that implement a feed application 116 having a feed user interface 118, an email application 120 having an email user interface 122, a media application 124, and a photo application 126. The feed application is capable of receiving feeds, such as from network feeds 128, and presenting content of those feeds. The email application is capable of receiving email, such as from network email 130, and presenting the email content. The media application is capable of rendering audio and video content. The photo application is capable of rendering visual content.

Network computer-readable media 114 comprises the network feeds and network email, both of which are capable of sending content across network 104 to computer 102.

Presenting Feed Content

Figure 2:
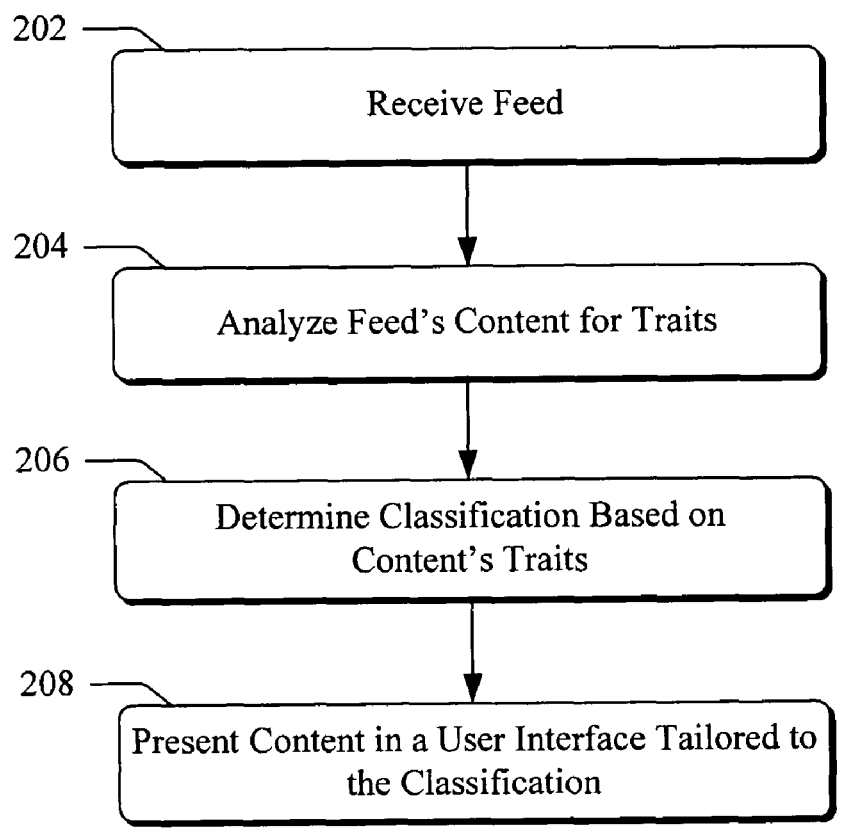
FIG. 2 is an exemplary process for presenting content in a user interface tailored to the content's trait(s).

The following discussion describes an exemplary process 200 for presenting feed content in a user interface tailored to the content's traits. This process is illustrated in FIG. 2 as a series of blocks representing individual operations or acts performed by elements of environment 100, such as feed application 116 and feed user interface 118. This and other processes described herein are directed to these elements to aid the reader in understanding particular embodiments of the tools and are not intended to limit application of the tools to this environment. These processes can be implemented in any suitable hardware, software, firmware, or combination thereof. In the case of software and firmware, these processes represent sets of operations implemented as computer-executable instructions.

Block 202 receives a feed, such as from network feeds 128 across network 104. In some cases these feeds are markup language files, such as files written in eXtensible Markup Language (XML). Feed content is a set of items that can comprise links, text, inline photos, enclosures (e.g., a link to an associated file), and a list of more items, to name a few. A feed from Yahoo!™ News for instance, may predominantly comprise links to news articles.

Block 204 analyzes a feed's content for its traits. Block 204 can determine the content's structural and media traits, such as whether or not the feed content is primarily links, text, inline photos, enclosed media, and the like.

In one embodiment, feed application 116 analyzes a feed's content to determine whether the content has multiple short pieces of text, text without viewable markup language, text with viewable markup language (e.g., HyperText Markup Language—HTML), enclosures, and comments. To do so, the feed application can determine whether or not a feed's content has a description field less than 100 characters (or no description field), a description field having more than 100 characters without HTML, a description field having CDATA including HTML, enclosures (e.g., photo, audio, and video enclosures), and trackbacks or comments, respectively. Block 204 can also determine which trait or traits are dominant in a feed's content.

Block 206 determines a classification to which the feed's content is suited based on its traits. Here feed application 116 compares the traits of the content with five predetermined classifications. The five classifications are: link; text; formatted text; enclosed media; and conversations. These classifications are assigned based on the traits of the content or, in some cases, based on a user's or feed source's selection. In some cases a user classifies a feed, such as when the user subscribes to the feed. In others, the feed contains metadata indicating that the feed's content has a particular classification or its associated user interface, such as the Yahoo!™ News feed having an indicator classifying the feed as belonging to a link classification.

Each of these classifications is associated with a user interface. Here the link classification has a news-oriented user interface. The text and formatted text classification has a blog-oriented user interface. The conversation classification has a conversation-oriented user interface. The enclosed media classification has an enclosure-oriented user interface.

Block 208 presents content tailored to the content's classification. In so doing it presents a feed in a user interface tailored to traits of the feed's content. Three exemplary user interfaces are presented below and tailored to three different classifications. These user interfaces are provided to show ways in which feeds can be presented based on the feed's content, though other user interfaces are also contemplated by the tools.

Figure 3:
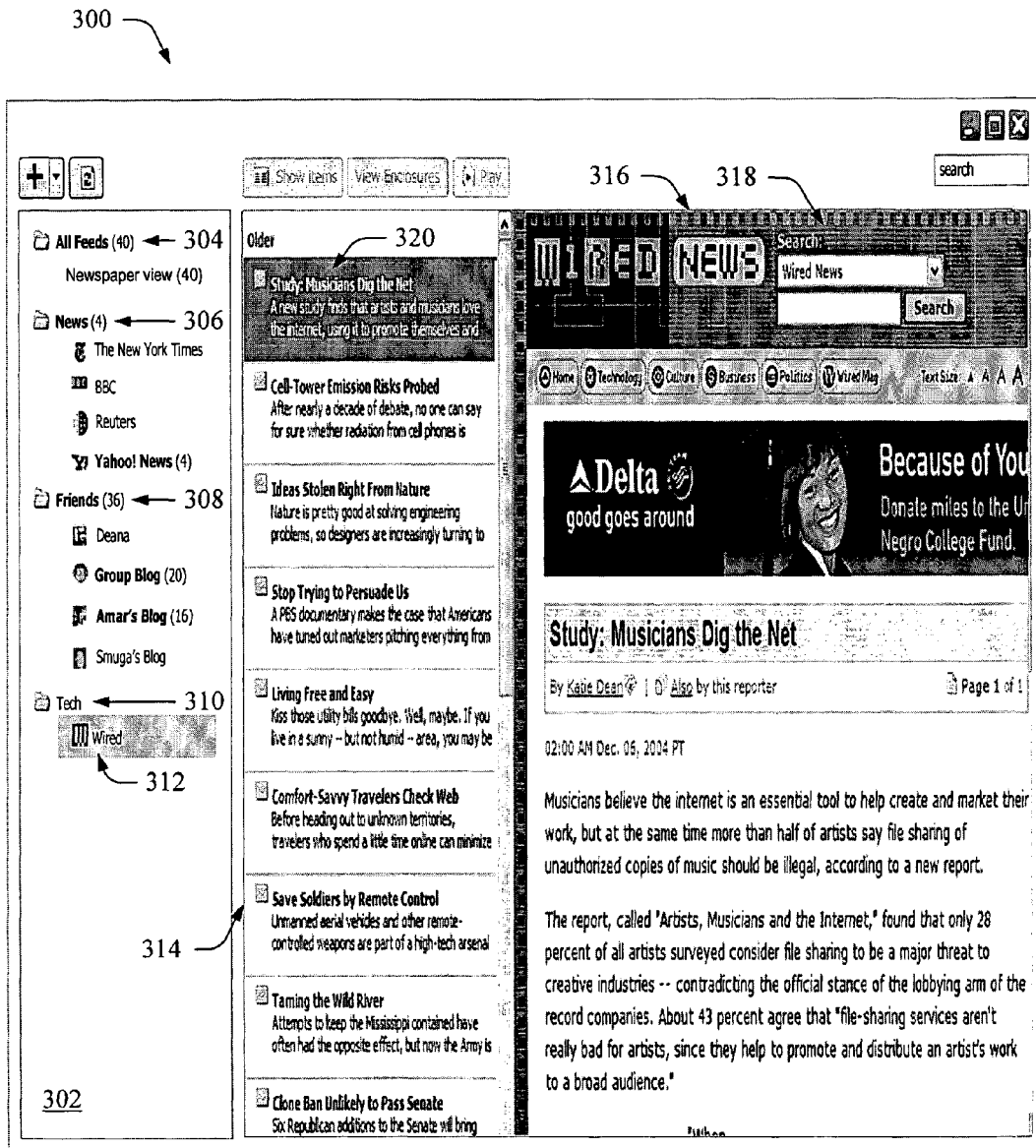
FIG. 3 illustrates an exemplary graphic user interface tailored to a links classification.

FIG. 3 sets forth an exemplary graphic user interface 300 tailored to the links classification. This interface comprises a feeds display region 302 listing feeds oriented in a hierarchy. Here all feeds are navigable with folder 304, news feeds with folder 306, friends feeds with folder 308, and a tech feed with folder 310 having a wired feed 312.

This interface also comprises a summary region 314 with headlines (e.g., titles, indicia, or short descriptions) of content items. The headlines shown are listed chronologically from items received in wired feed 312. The content items are displayed with headlines because the feed is primarily directed to providing a user with links to other sources. Users are enabled to see enough information with a headline to determine whether or not they wish to view details for the content item—such as a webpage showing a full article related to the headline.

Interface 300 also comprises a details region 316, which provides details about an item in the feed. The feed application here renders a webpage 318 associated with a first item headline 320. The feed application can render a webpage associated with content automatically or responsive to a user's selection. Here the webpage is rendered by the feed application responsive to a single user action of selecting the first item headline.

Figure 4:
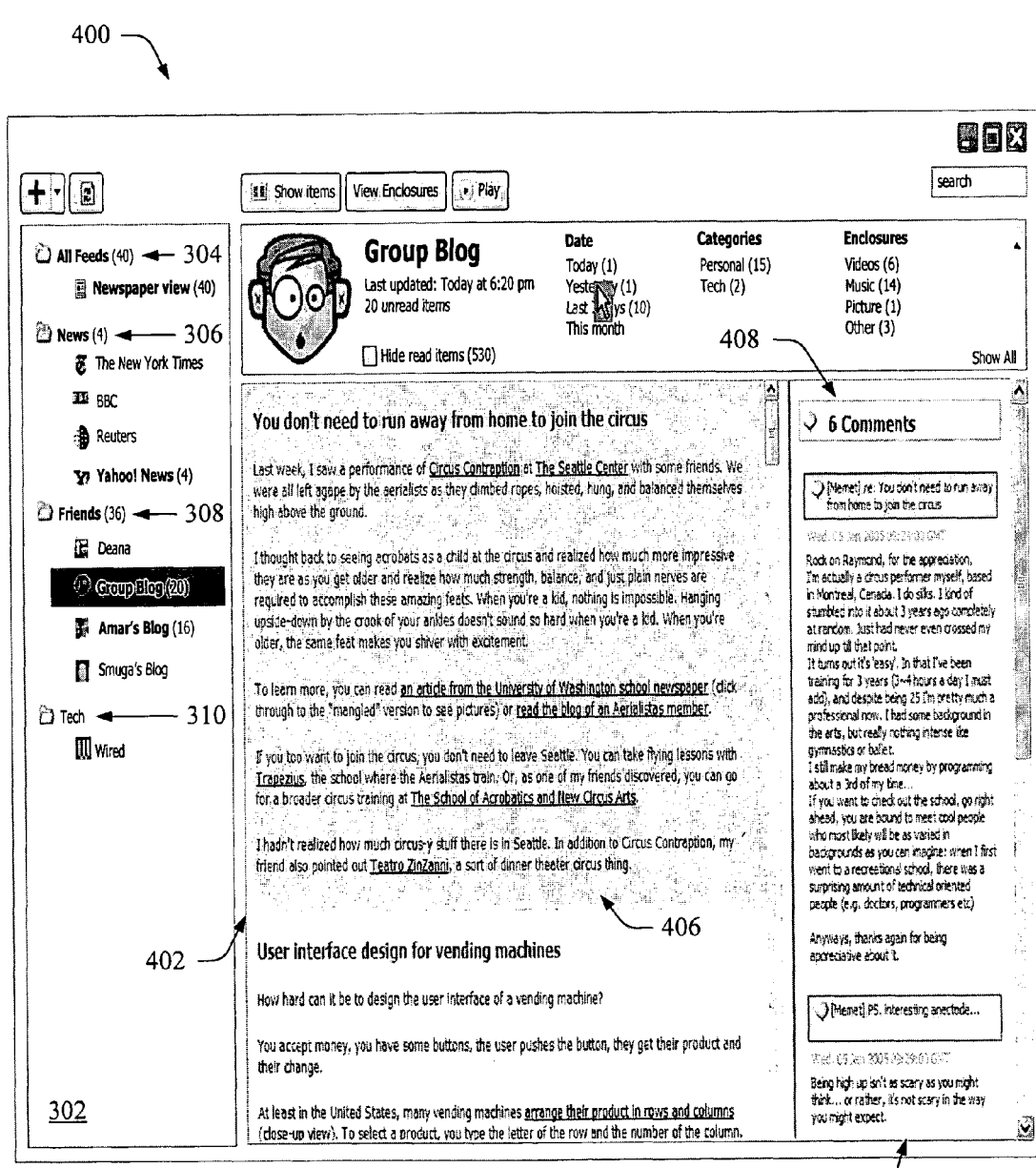
FIG. 4 illustrates an exemplary graphic user interface tailored to feed content having comments.

FIG. 4 sets forth an exemplary graphic user interface 400 tailored to feed content having comments. This interface comprises a region for original content 402 and one for comments related to that content 404. These regions enable a user to see the comments and the context (e.g., the original content) for the comments at once. Here the interface presents a blog entry at 406 in original content region 402 and comments about the blog entry shown at 408 in the related comments region 404. This user interface may present the comments automatically for any content having related comments or responsive to a user selection. The user's selection can be a single user action, such as selecting a comments control 410 shown in FIG. 7.

Figure 5:
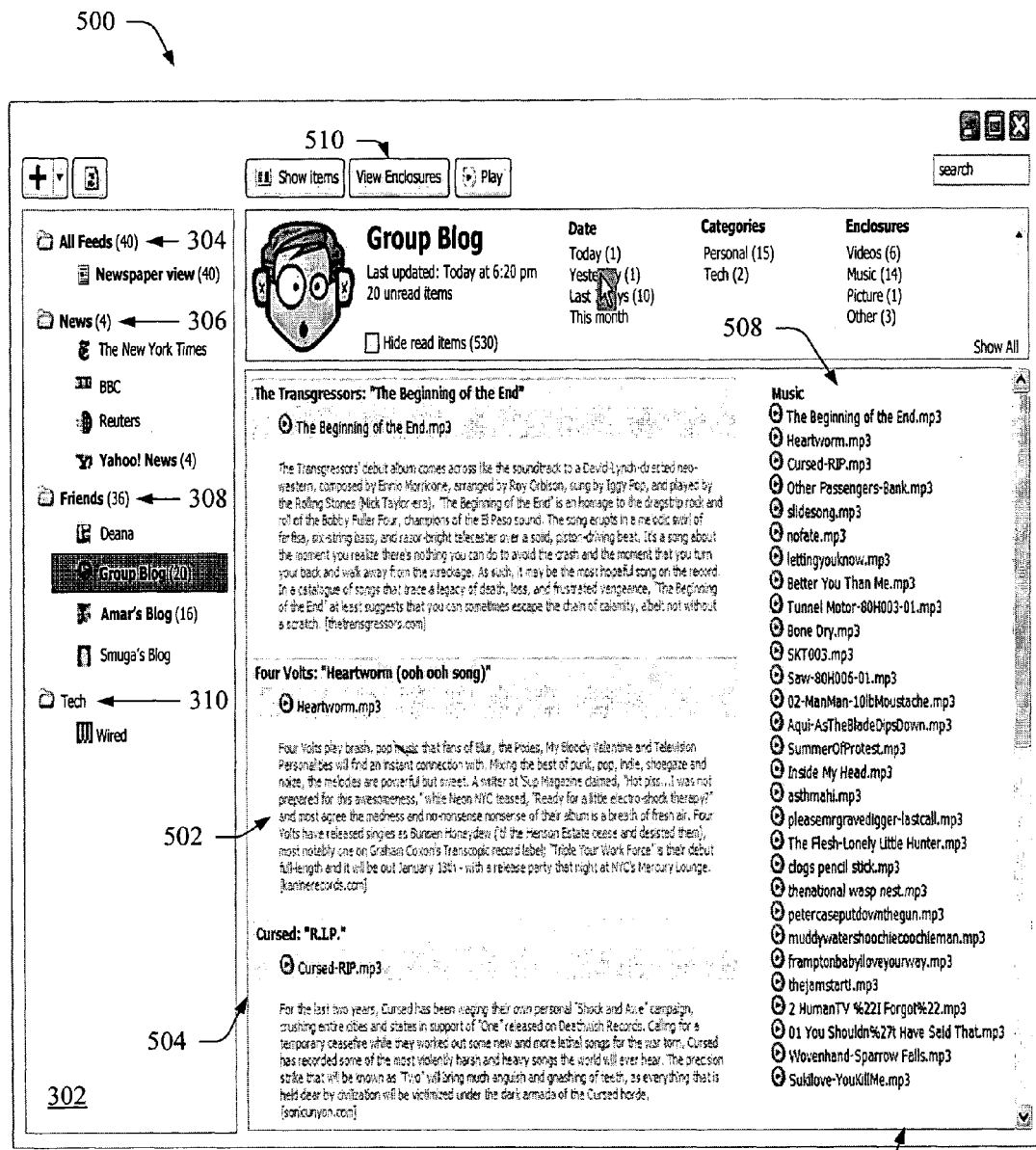
FIG. 5 illustrates an exemplary graphic user interface tailored to feed content having enclosures.

FIG. 5 sets forth an exemplary graphic user interface 500 tailored to feed content having enclosures. This interface comprises a region listing enclosures for content items of a feed and another having indicia for the items. All enclosures or enclosures grouped by type, such as picture enclosures, music enclosures, and document enclosures, can be displayed. Here textual indicia 502 (e.g., reviews of enclosed songs) for the content items having music enclosures are shown in content indicia region 504. The music enclosures for these and other content items of the group blog feed are listed in enclosure region 506. The enclosures can be presented automatically by the feed application or responsive to a user selection. Here indicia 508 (e.g., song titles) for the enclosures are presented responsive to a user action selecting a view enclosures control 510.

The tools can also render the enclosed files shown in region 506 with or without user action. A user may, for instance, select to play one of the music files in region 506 by clicking on the title for that file. Responsive to this selection the tools can render (play) this file. This and other ways in which the tools can render files are set forth in greater detail below as part of process 600.

Filtering and Navigating Feed and Email Content

Figure 6:
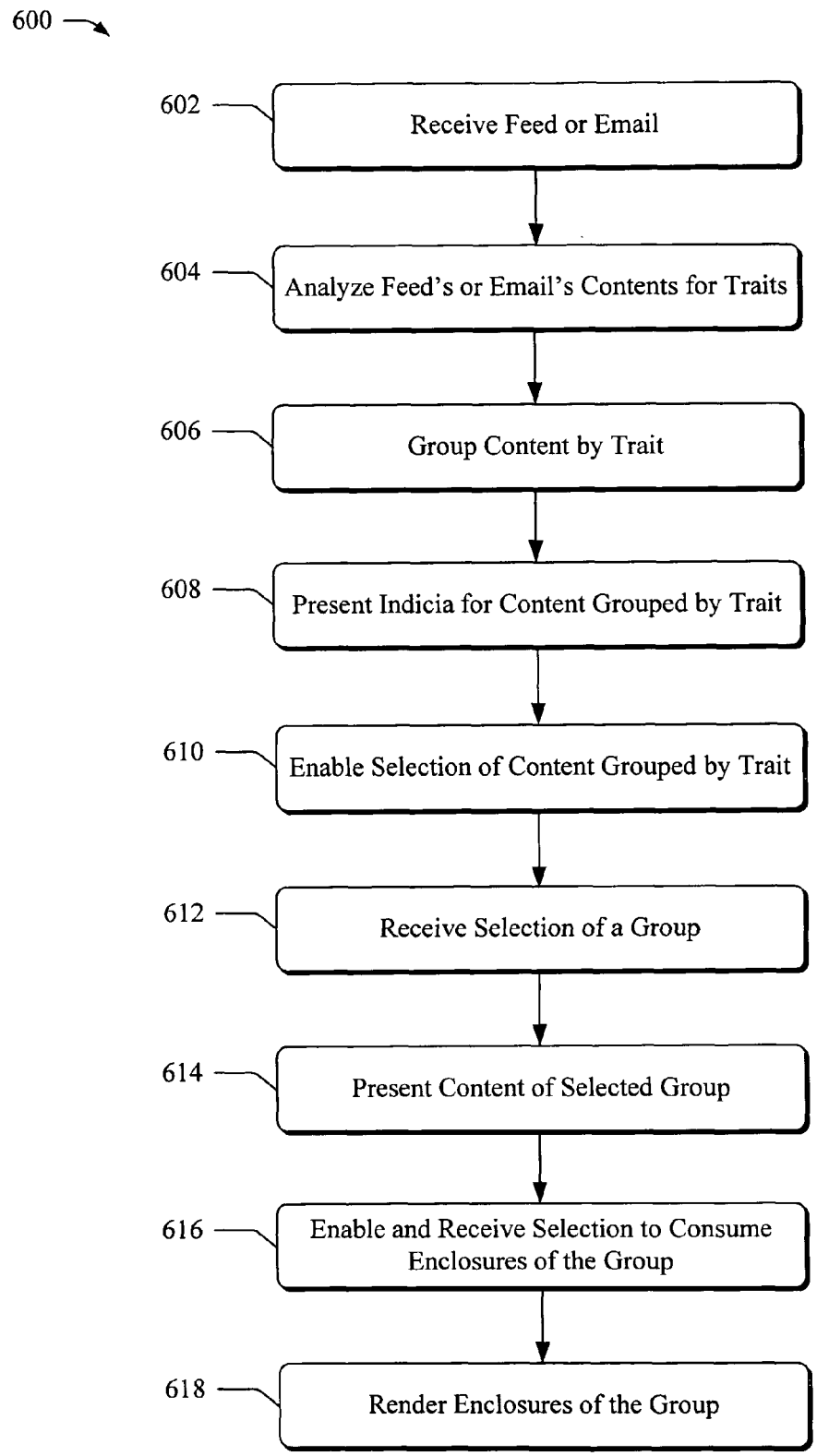
FIG. 6 is an exemplary process enabling a user to view, select, and play feed and email content based on traits for that content.

The following discussion describes a process illustrated in FIG. 6 at 600 that enables a user to view, select, and play feed and email content based on traits for that content. This process is illustrated as a series of blocks representing individual operations or acts performed by elements of environment 100, such as feed application 116, feed user interface 118, email application 120, email user interface 122, media application 124, and photo application 126.

Block 602 receives content having one or more traits. These contents may be received through one or more feeds, such as Rich Site Summary (RSS) feeds, or email.

Block 604 analyzes these contents to determine their traits. Similar to process 200 above, the tools ascertain various traits of the contents. These traits can include when each content was received, from which feed or email sources they were received, whether there are comments associated with any of them, whether any are part of a string of items (e.g., an email in an email string), and whether any have enclosures and their types (e.g., photo, media, music, or document).

Assume, for example, that email application 120 receives many emails (each an item of content). Each of these emails may have defining characteristics or traits, such as types of enclosures, whether or not the email is part of an email string, or how many comments have been made to that email (e.g., how many strings originate from the email).

Assume, also for example, that feed application 116 receives many content items from multiple feeds, such as from a blog feed and a news feed (e.g., BBC™). Each of these items can be grouped by their different feeds sources, by when they were received, their enclosures and the enclosures' types, and user- or source-defined categories or other metadata. Thus, one group may have all content items received today from both feeds. Another may have items with music file enclosures from the BBC feed. Another may just have items having video enclosures from both feeds that have not been read by a user.

In both of these examples, the tools can ascertain traits of the content items that may be used to group them, display them, or enable their selection.

In one embodiment, feed application 116 analyzes content items from a blog feed and determines that one item was received today, one was received yesterday, ten were received in the last seven days, fifteen are categorized as personal in metadata associated with the feed source, two are categorized as technical in metadata associated with the feed source, six have video enclosures, fourteen have music enclosures, one has a picture enclosure, and three have other types of enclosures (e.g., word processing or spreadsheet documents). The feed application determines that the content items have various types of enclosures by finding enclosed files having particular extensions. For example, files with .jpg, .png, and .bmp extensions are deemed visual files; files with .mp3 and .wma are deemed music files; .wav are deemed video files; and .ppt, .doc, .vsd, and .xls are deemed other types of files.

Block 606 groups content items having a common trait. Content items may be grouped in more than one group, such as a content item received today that has a music enclosure—it can be in the received today group and the music enclosure group.

Block 608 presents indicia for the content oriented by group. These indicia can indicate what common trait is being used to group the content items or other information about the content items.

Figure 7:
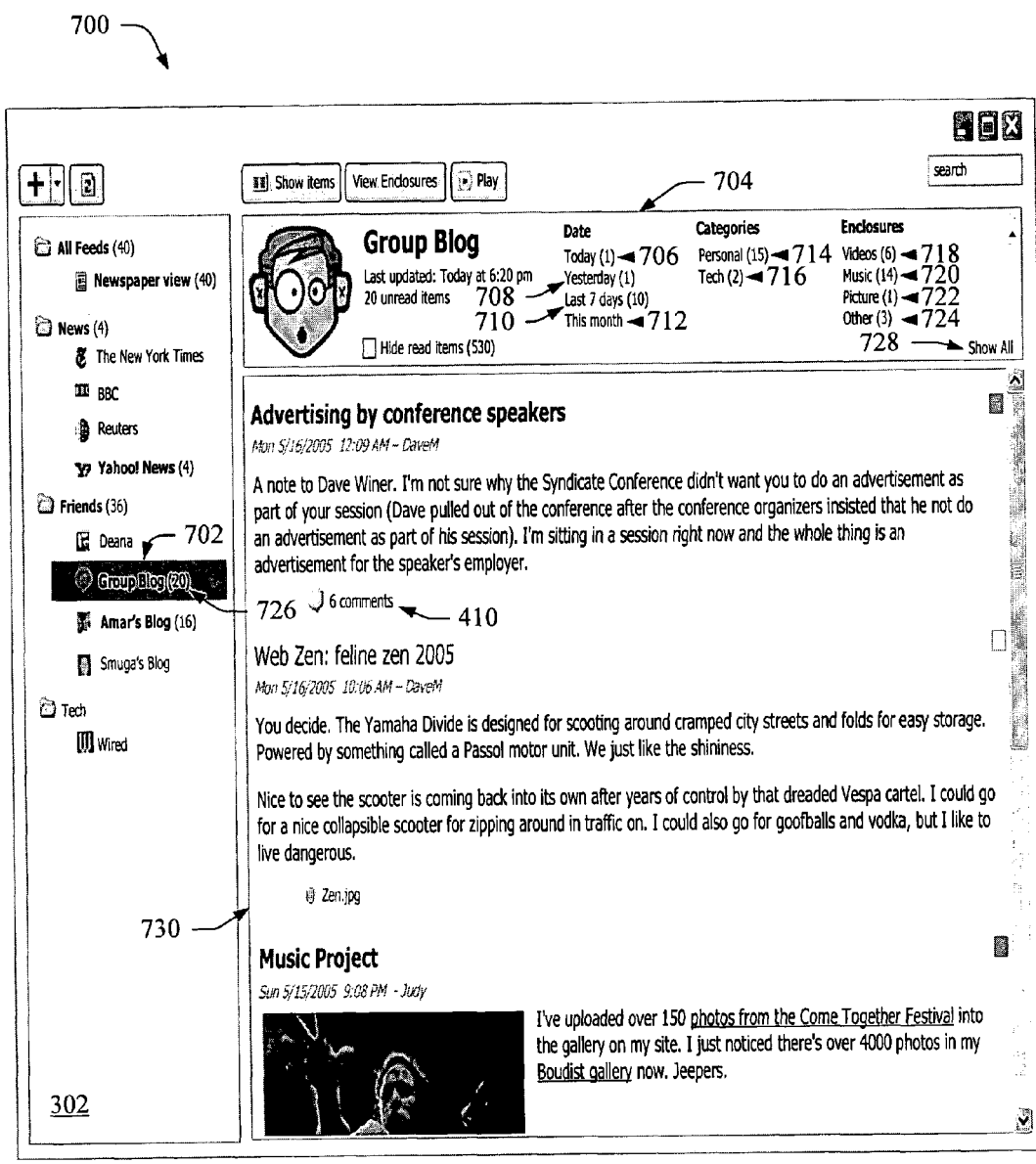
FIG. 7 illustrates an exemplary graphic user interface presenting indicia for content items of a blog feed oriented by groups with common traits.

FIG. 7 sets forth an exemplary graphic user interface 700 presenting indicia for content items of a blog feed 702 oriented by groups with common traits. This shows a filter region 704 presenting selectable indicia for content grouped by ten traits. The user interface shows four groups oriented by date: today indicia 706; yesterday indicia 708; last seven days indicia 710; and this month indicia 712. The user interface shows two groups oriented by category (here previously user-defined categories): personal indicia 714; and technology indicia 716. Also, the user interface shows four groups oriented by their enclosures: video indicia 718; music indicia 720; picture indicia 722; and other indicia 724. Presenting content items grouped by common traits enables a user to easily navigate through content items.

Block 610 enables selection of the content items by common traits, such as the groups presented at block 608. Block 610 may enable a user to select multiple items in a group by selecting indicia or otherwise. In FIG. 7, block 610 enables a user to select a group of content items with a single user action.

FIG. 7 also shows other indicia for the group blog's content items. Each of the displayed groups also share a common trait of not having been marked as read by a user. Thus, the today indicia shows with "(1)" that one item was received today but has not been read. Similarly, that of the items received between eight days and thirty days ago none of them are as yet unread (indicated by no number following this month indicia 712). This user interface also indicates to a user the number of unread items by source, here that twenty content items of group blog 702 have not been read (indicated by the "(20)" marked at 726). The user may select instead to show all of the content items for the group blog, read and unread, by selecting a selectable control (entitled "show all" and marked at 728).

The content items common to a particular trait may be displayed in a content display region 730 by default or by selection. User interface 700 displays by default all content items sharing the trait of originating from the group blog in the content display region. Read and unread items are displayed in order based on the time that they were received.

Block 612 receives selection of a group of content items oriented by a common trait. The user may select a group with a single user action. Here feed user interface 118 receives a user's selection of music indicia 720.

Block 614 presents the content of the selected group. The user selected to view the content that has music file enclosures by selecting 720 in FIG. 7. In response, the feed user interface presents this content in content display region 730, shown in FIG. 8.

In some cases a user may want to see or consume additional content of or related to displayed content items, such as all of the enclosures of the displayed content items.

Block 616 enables and receives a user's selection to consume enclosures of a group. Block 616 can enable the user to select to consume enclosures from one or more content items with a single user selection and through various input manners, such as keyboard entry, voice entry, and selectable controls.

Figure 8:
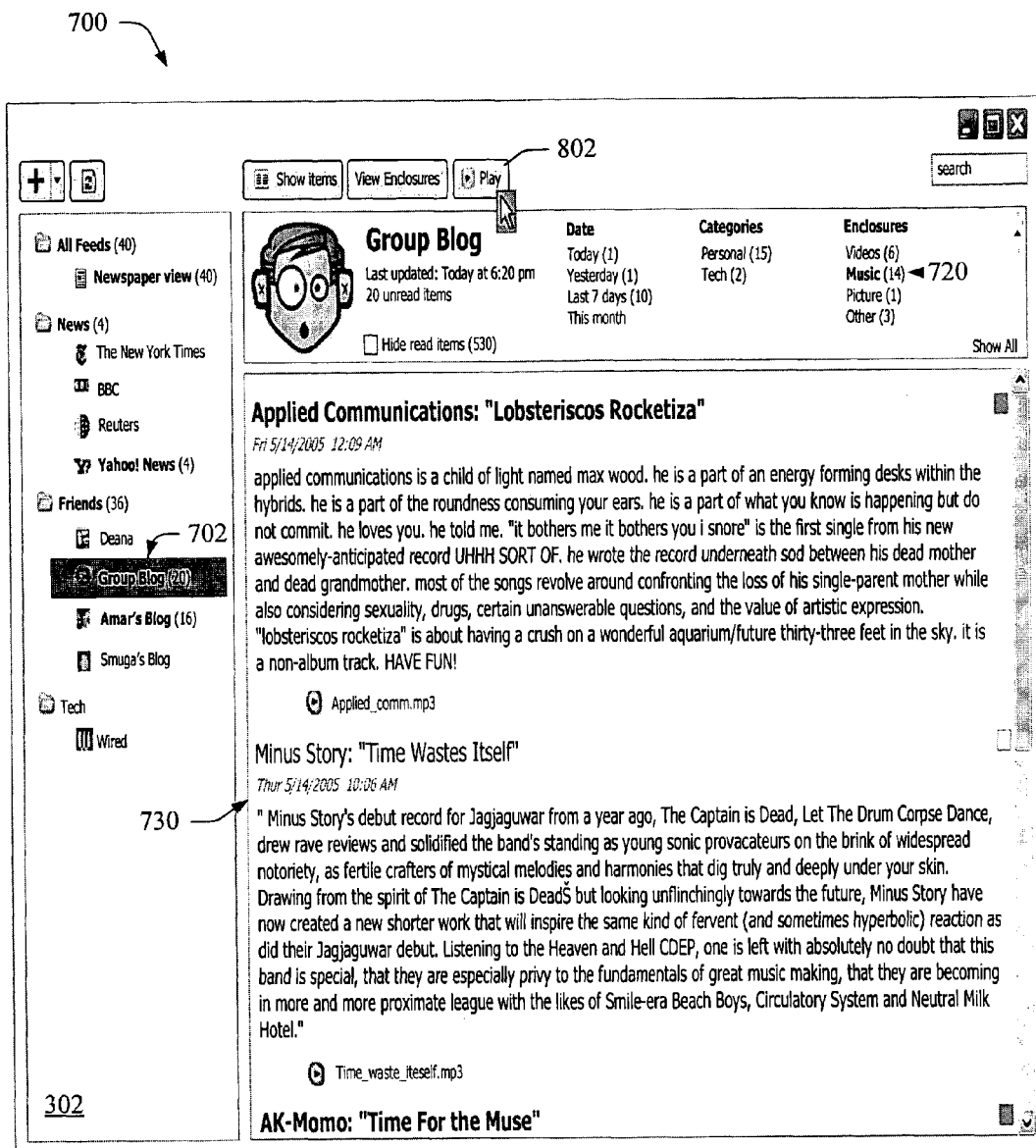
FIG. 8 illustrates the user interface of FIG. 7 along with a selectable consume control.

Here feed user interface 118 present a selectable consume control 802, entitled "Play" in FIG. 8. By selecting this control the user indicates that he or she would like to play all of the enclosures of content items that have music file it enclosures. Some of these content items are displayed in content display region 730, though here all of the enclosures that may be displayed in this region (such as by scrolling to see them) are selected.

Block 618 renders one or more enclosures of a selected group of content items. Block 618 may render enclosures through applications integrated with the feed or email applications (feed user interface 118 or email user interface 122) or with disparate applications (e.g., media application 124 or photo application 126).

Figure 9:
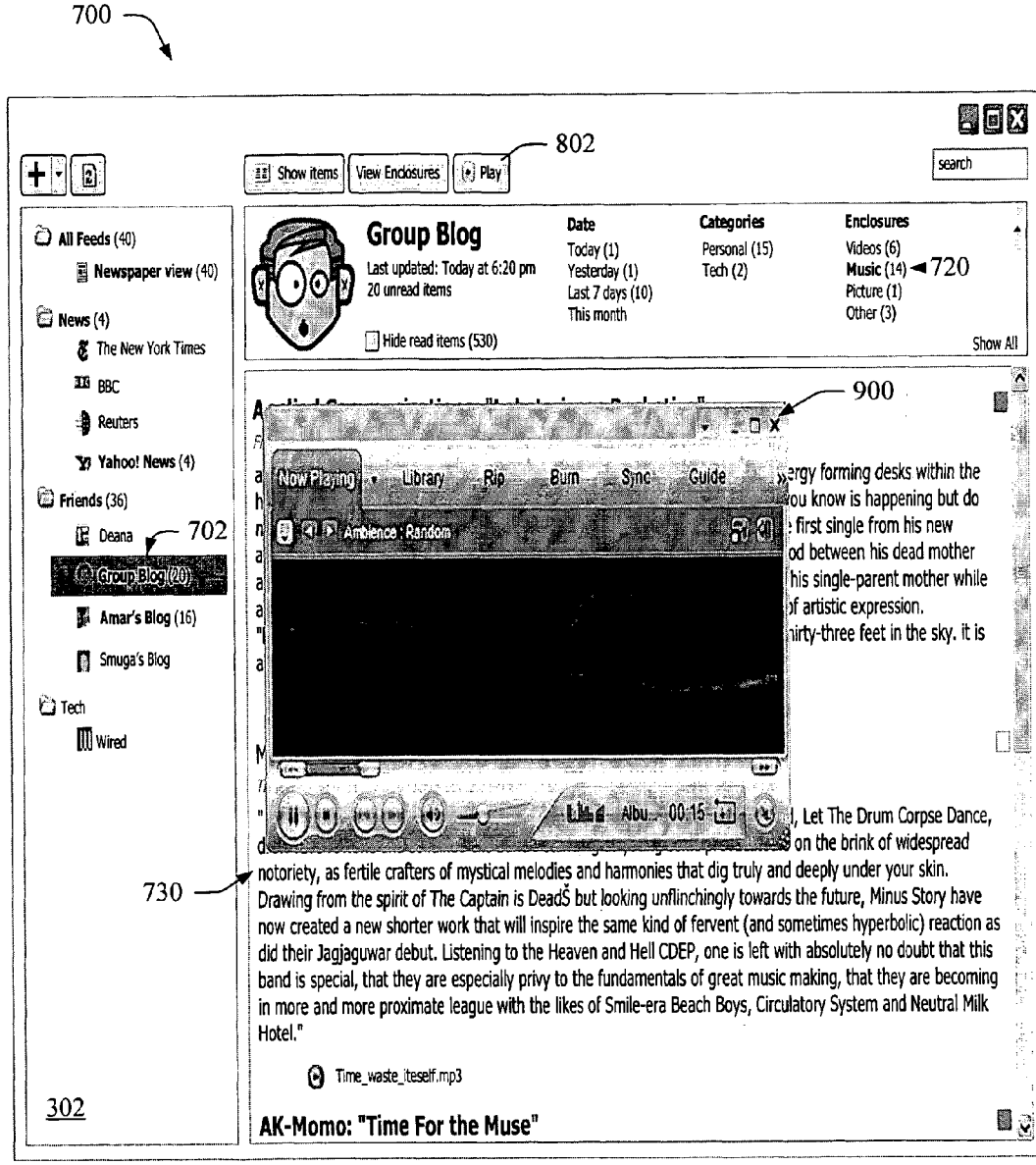
FIG. 9 illustrates the user interface of FIG. 8 with a rendering user interface generated by a media application.

FIG. 9 shows user interface 700 from FIG. 8 with the addition of a rendering user interface 900 generated by media application 124. The media application plays all of the music files enclosed in content items of the selected group. Block 618 can open the media application, pass one or more of the music enclosures to the media application, and instruct the media application to play one or more of the music enclosures without further user action. This enables a user to select, with a single user action, to open, render, or play (as appropriate) multiple enclosed or attached files from one or more content items. With the media application open and rendering the music files, a user can then interact with the media player normally, such as to skip to another of the enclosed files, stop the rendering, and the like.

Altering Traits and Navigating Based on Them

Figure 10:
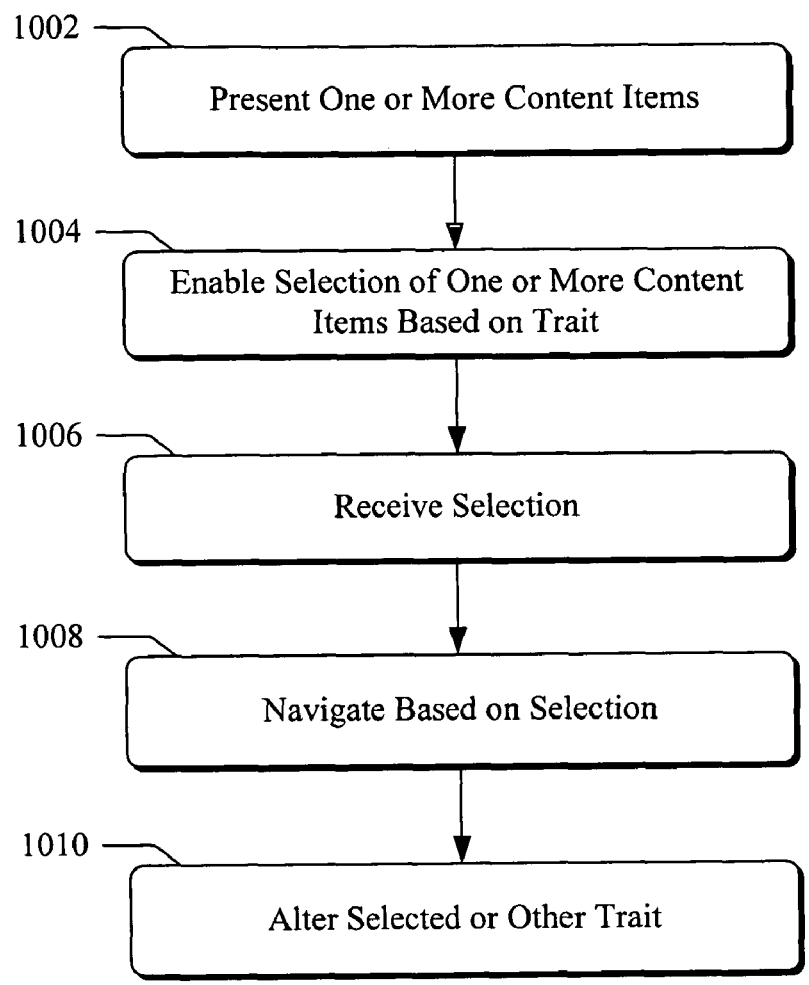
FIG. 10 is an exemplary process enabling a user to navigate and/or alter traits through selection of content items based on their traits.

The following discussion describes a process 1000 illustrated in FIG. 10 that enables a user to navigate and/or alter traits through selection of content items based on their traits. This process is illustrated as a series of blocks representing individual operations or acts performed by elements of environment 100, such as feed application 116 and email application 120.

Figure 11:
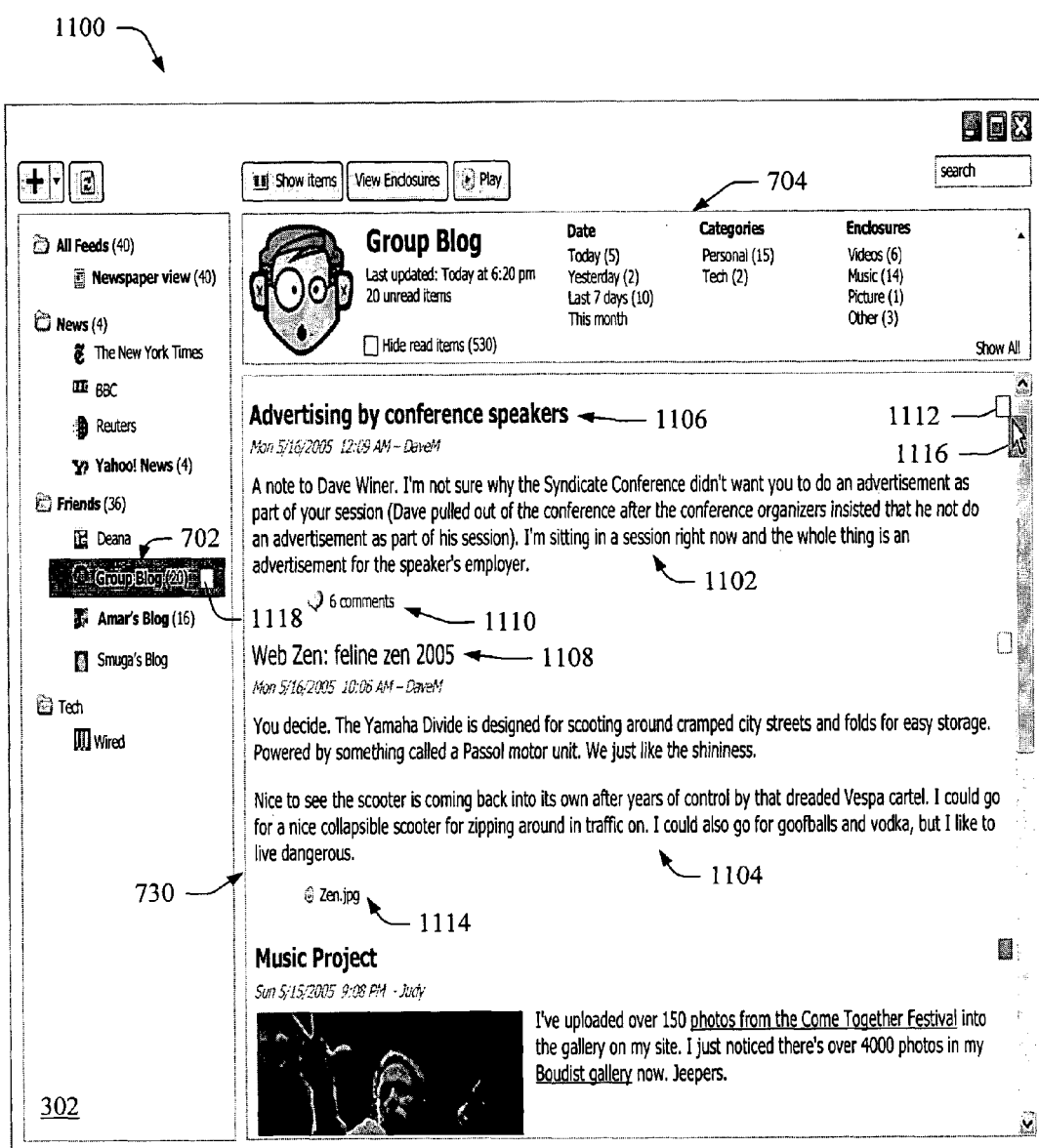
FIG. 11 illustrates a user interface showing content and selectable controls.

Block 1002 presents content for one or more content items. An example of this is shown in FIG. 11. Here user interface 1100 presents content 1102 and 1104 for first and second content items 1106 and 1108. First content item 1106 is an article entitled "Advertising by conference speakers" and second content item 1108 is an article entitled "Web Zen: feline zen 2005." Both are received from group blog 702 shown in region 302.

Block 1004 enables selection of one or more content items based on their traits. These traits may be indicated by graphics, icons, or other indicia and be selected with a single user action. As set forth above, feed application 116 and email application 120 may present items based on their traits and enable selection of items grouped by common traits. Content items from multiple feeds or email sources may be presented based on their comments, enclosures, or time received, for instance. The feed application presents content items from one feed grouped by other common traits in FIG. 7 at filter region 704, for instance.

Here user interface 1100 presents three selectable controls 1110, 1112, and 1114. Selectable control 1110 is associated with content item 1102 having comments. Selectable control 1112 is associated with content item 1102 being unread. Selectable control 1114 is associated with enclosure(s) of content item 1104.

Block 1006 receives a user's selection of one or more content items based on their trait(s). Assume that a user selects unread selectable control 1112 with a single user action, here shown in FIG. 11 with a highlighted selector 1116.

Block 1008 navigates based on the selection. If, for example, a user selects a group of content items, block 1008 can navigate to all of them, such as by displaying them in a region of the interface. Or if a user selects one or a group of items by trait, block 1008 may open associated web page(s), such as in content display region 730 of FIG. 7 or 11.

Figure 12:
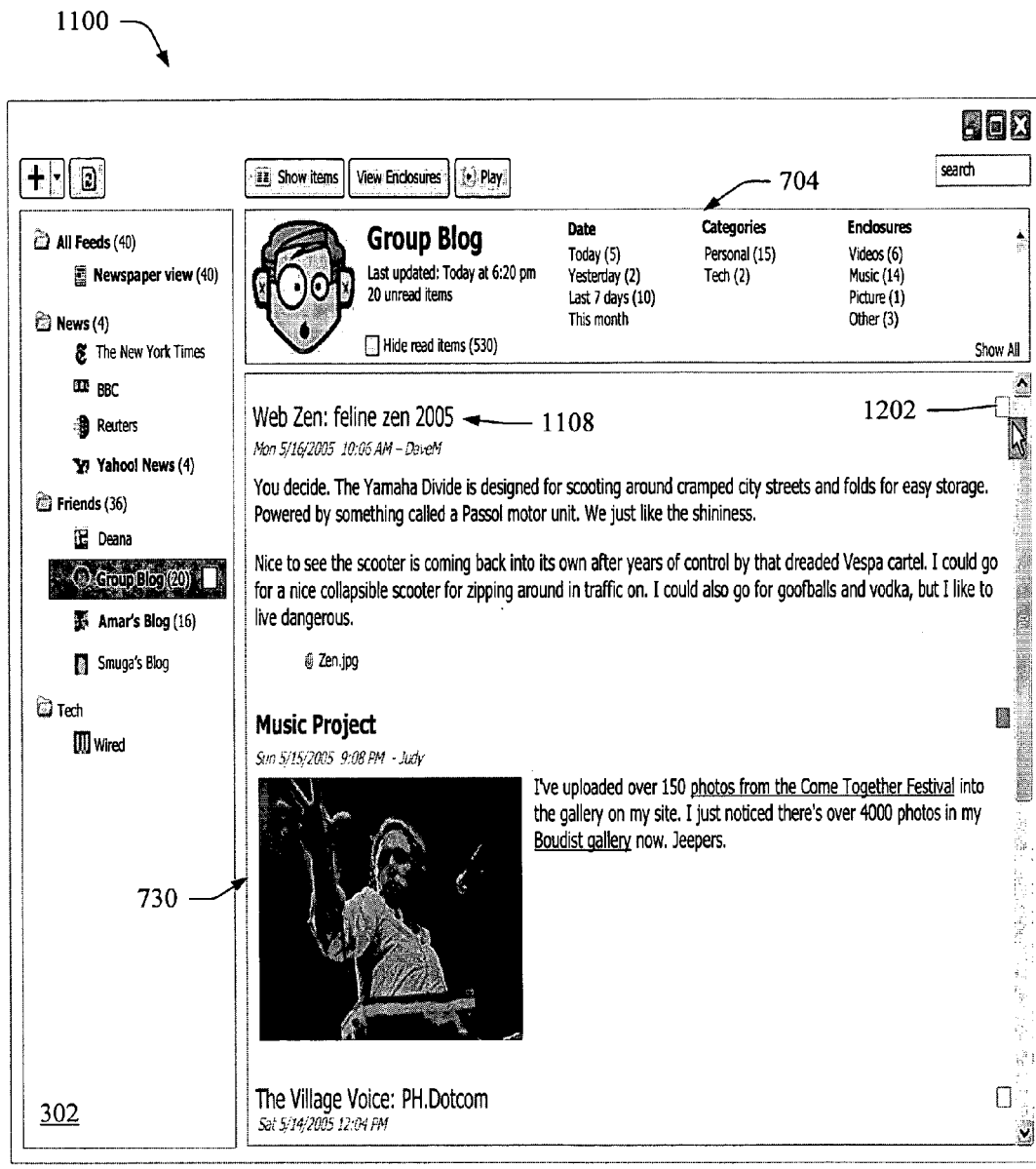
FIG. 12 illustrates the user interface of FIG. 11 navigated to another content item.

Here feed user interface 118 scrolls to the next content item displayed in the content display region (second content item 1108) responsive to selection of unread control 1112 and shown in FIG. 12.

Block 1010, in some embodiments, alters a trait responsive to the user's selection. A user's selection of a trait may also or instead be considered a selection to alter that or another trait. In some cases this may improve a user's navigation and management of content by making more efficient his or her interactions. If a user selects an unread control associated with multiple items (such as one for an entire feed) block 1010 can mark all of the items of this group as read, thereby changing this trait for multiple content items. For example, a feed unread selectable control 1118 is shown in FIG. 11 for the group blog feed.

When the user selected unread control 1112 in FIG. 11, the feed application assumed that the user also indicated a selection to mark the article as read, rather than unread. In response the feed application can alter the selected trait from unread to read. The tools can navigate and alter a trait responsive to a single user action, such as by performing blocks 1008 and 1010 without additional user action following the user's selection received at block 1006.

Also for example, a user may select, as shown in FIG. 8, to play music enclosures. Block 1010 can mark content items having these music enclosures as read if the user listens to each of the music enclosures or automatically once the user selects these items based on this music enclosure trait.

The tools may return to block 1004 for selection of other content items. FIG. 12, for instance, shows a selectable control 1202 associated with second content item 1108 being unread. In this embodiment, user interface 1100 presents this selectable control at a substantially similar or same position in the user interface as selectable control 1112, thereby permitting a user to repeatedly select to mark content items as read and scroll to the next item without having to move his or her mouse selector. The tools may present the selectable control at a same position in the user interface for a selectable control associated with a single or a group of content items.

Figure 13:
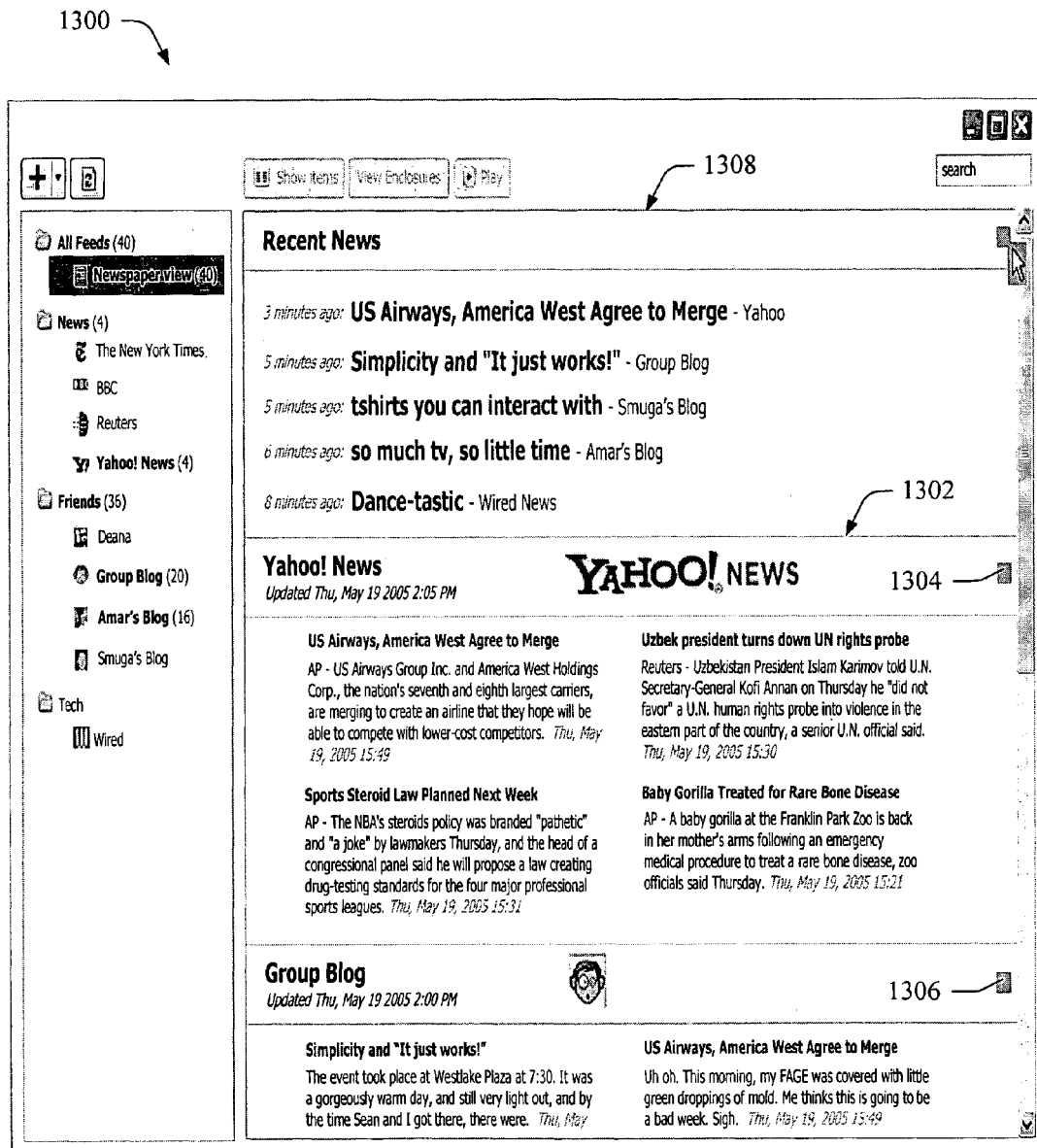
FIG. 13 illustrates an exemplary user interface having a region showing content items from multiple feeds.

FIG. 13 illustrates a group selectable control. Here an exemplary graphic user interface 1300 enables a user to select and navigate through groups of content items. Content items are displayed grouped by feed in a multiple feed region 1302 (from Yahoo™ News and group blog). These feeds have a read/unread selectable control 1304 and 1306, respectively. Responsive to selection of control 1304, the tools scroll to show the group blog content items in the area just occupied by the Yahoo™ News items. The tools can orient control 1306 at the location just occupied by control 1304. This enables the user to easily select control 1306 to further scroll through groups of content items.

This interface also provides an example of content items grouped by date and feed. The interface comprises a summary region 1308 (entitled "Recent News"). The summary region comprises headlines (e.g., titles, indicia, or short descriptions) of content items in an order based on their chronology and feed. The headlines are from five different feeds: "Yahoo"; "Group Blog"; "Smuga's Blog"; "Amar's Blog"; and "Wired News".

Feed application 116 can orient these summaries based on various filtering factors. Here the feed application determines which feeds have a links classification, what content in these feeds has not been read by the user, the age of that content, and the user's prior use of the feeds. The feed application then presents headlines for content items in chronological order for the five feeds with the strongest usage history in region 1308.

To determine which feeds have the strongest usage history (e.g., are most popular with the user), the feed application tracks which feeds are most often visited by the user and the number of read items in each feed compared to the number of unread items. If the ratio of read items to unread items for a feed is high (thus, a high percentage of the feed's items are read) the feed application ascertains that this feed is important to the user.

These factors may also be used to orient the order in which content is displayed in region 1302. As shown in FIG. 13, feeds having details for the first two listed summaries are shown in the same order in region 1302.

CONCLUSION

The above-described tools present content in a user interface tailored to traits of the content. They can organize content items into groups based on the content items having a common trait and enable a user to select content items by their group. Responsive to the user's selection of a group, the tools can present content, render enclosures, and alter traits of the selected content items. These and other abilities of the tools can make it easier and more enjoyable for a user to interact with content received from feeds and email sources. Although the tools have been described in language specific to structural features and/or methodological acts, it is to be understood that the subject matter defined in the appended claims is not necessarily limited to the specific features or acts described. Rather, the specific features and acts are disclosed as exemplary forms of implementing the claimed system, method, and/or computer-readable media.

The invention claimed is:

1. One or more computer-readable media having computer-readable instructions therein that, when executed by a computer, cause the computer to perform acts comprising:
   analyzing a feed's content to determine its trait(s);
   assigning a classification to the feed's content based on one or more traits of the feed's content to provide a classification; and
   presenting the feed's content in a user interface tailored to the classification, wherein the user interface comprises:
      a first region comprising a feeds display region listing feeds oriented in a hierarchy, wherein the feeds oriented in a hierarchy are selectable to cause presentation of at least one other region containing a selected feed's content, wherein the at least one other region is included in the user interface that includes the first region.

2. The media of claim 1, wherein trait(s) are one selected from a group consisting of:
   a description field of less than or about 100 characters;
   a description field having viewable markup language;
   trackbacks;
   comments;
   enclosures; and
   text without links.

3. The media of claim 1, wherein the act of assigning the classification comprises comparing the feed's content's trait(s) to a predetermined set of two or more classifications.

4. The media of claim 1, wherein the acts of analyzing, assigning the classification, and presenting are performed without user action.

5. The media of claim 1, wherein the act of presenting comprises presenting another feed's content in the user interface such that at least one region lists one or more other links from the other feed's content and an additional region presents a portion of the other feed's content associated with the other links.

6. The media of claim 5, further comprising listing the links and the other links in an order based on a user's prior use of the feed and the other feed.

7. The media of claim 1, wherein the user interface comprises a region presenting the feed's content and another region presenting comments associated with the feed's content.

8. A method comprising:
   grouping, without user action, a plurality of content items received from at least one Rich Site Summary (RSS) network feed source, the content items having common traits, to provide groups of content items, the grouping comprising:
      determining a type of content item, wherein types of content items comprise links, text, inline photos, comments, or enclosures, wherein an enclosure comprises a link to an associated file; and
      determining structural and media traits for each content item wherein structural traits comprise the amount of the content item having a particular trait and media traits comprise the type of media the traits represent, wherein each of the traits are one or more of a plurality of traits including:
         multiple short pieces of text;
         text without viewable markup language;
         text with viewable markup language;
         enclosures;
         trackbacks; and
         comments;
   enabling selection of the groups of content items by presenting a user interface that includes a first region listing of one or more groups of content items oriented in a hierarchy;
   receiving selection of one of the groups of content items to provide a selected group of selected content items; and
   presenting, in at least a second region of the user interface that includes the first region, content for the selected content items of the selected group.

9. The method of claim 8, wherein the content items are emails.

10. The method of claim 8, wherein enabling selection of the groups of content items comprises enabling selection with a single user action.

11. The method of claim 8, wherein enabling selection of groups of content items is performed without user action.

12. The method of claim 8, further comprising:
   analyzing the content items to determine their common traits; and
   assigning a classification to each content item, wherein the classification is assigned based on comparing the traits of each content item to a plurality of predetermined classifications, wherein the predetermined classifications comprise:
      link;
      text;
      formatted text;
      enclosed media;
      conversations;
      user selected; and
      feed source selected,
      wherein user selected and feed source selected are determined such that:
         in an event that a user has selected a classification for a particular content item, assigning that content item to the user selected classification, wherein the user selected classification is selected from the predetermined classifications or a user defined classification; and
         in an event that a feed source has selected a classification for a particular content item, assigning that content item to the feed source selected classification, wherein metadata facilitates assignment to the feed source selected classification.

13. The method of claim 12, wherein analyzing the content items to determine their common traits comprises determining the content items' source, whether the content items comprise comments, attachments, or enclosures, or when the content items were received.

14. The method of claim 8, further comprising presenting indicia for the groups of content items in a first region of a user interface, wherein presenting content for the selected content items of the selected group comprises presenting the content in a second region of the user interface.

15. The method of claim 8, further comprising:
   enabling selection to consume enclosures of the selected content items of the selected group, wherein consuming enclosures comprises rendering the enclosures in a separate user discernable form; and
   rendering, responsive to a selection to consume the enclosures and without further user action, two or more enclosures of the selected content items of the selected group.

16. The method of claim 15, wherein rendering two or more enclosures of the selected content items of the selected group comprises:
   opening an application capable of consuming the enclosures;

passing the enclosures to the application; and instructing the application to render the enclosures without further user action.

17. A method comprising:

receiving at least one of a plurality of feeds from one or more network sources, the feeds providing news, blog entries, lists, media, and wherein each feed comprises content comprising at least one of a plurality of items of content and types of items of content comprise:

links;

text;

inline photos;

comments; and enclosures, wherein an enclosure comprises a link to an associated file;

analyzing traits of each received item of content to determine whether the predominant trait of the particular item of content includes:

multiple short pieces of text, text without viewable markup language, text with viewable markup language, enclosures, trackbacks; and comments, analyzing each received feed content item to determine, based on a description field, whether the feed content item has a description field;

in an event that the feed content item has a description field:

determining a size of the description field; and determining whether the description field includes hypertext markup language (HTML);

assigning a classification to each item of content based on comparing the traits of each item of content to one of a plurality of predetermined classifications, wherein the predetermined classifications comprise:

link;

text;

formatted text;

enclosed media;

conversations;

user selected; and feed source selected, wherein user selected and feed source selected are determined by:

in an event that a user has selected a classification for a particular item of content, assigning that item of content to the user selected classification, wherein the user selected classification is selected from the predetermined classifications or a user defined classification;

in an event that a feed source has selected a classification for a particular item of content, assigning that item of content to the feed source selected classification, wherein metadata facilitates assignment to the feed source selected classification;

determining a usage history for two or more of the plurality of the feeds;

presenting, as part of a user interface, a feeds display region listing feeds oriented in a hierarchy;

presenting, as part of the user interface, summaries for two or more of the items of content retrieved from the two or more of the plurality of feeds, the summaries being presented based at least in part on a chronological order and the usage history; and presenting each item of content in the user interface tailored to the classification, such that:

in an event that the item of content is assigned to the link classification, presenting the content in a news-oriented user interface;

in an event that the item of content is one of text and formatted text, presenting the content in a blog-oriented user interface;

in an event that the item of content is assigned to the enclosed media classification, presenting the content in an enclosure-oriented user interface;

in an event that the item of content is a conversation, presenting the content in a conversation-oriented user interface; and in an event that the item of content has comments, presenting the item of content in a content region and the comments in a comments region such that both regions are visible at once.

18. The method of claim 17 wherein the traits of items of content further comprise:

an indication of when each item of content was received;

an indication of from which source each item of content was received;

an indication that comments are associated with the item of content;

an indication of whether the item of content is part of a string of items; and an indication of whether the item of content has enclosures and an indication of a type of enclosure in the event that such enclosure exists.

19. The method of claim 18 wherein items of content further comprise emails.

\* \* \* \* \*